US006661922B1

(12) United States Patent
Boettcher et al.

(10) Patent No.: US 6,661,922 B1
(45) Date of Patent: Dec. 9, 2003

(54) METHOD OF DETERMINING A NEAREST NUMERICAL NEIGHBOR POINT IN MULTI-DIMENSIONAL SPACE

(75) Inventors: Mark E. Boettcher, Vancouver, WA (US); Nathan D. Mellor, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 975 days.

(21) Appl. No.: 09/598,530

(22) Filed: Jun. 21, 2000

(51) Int. Cl.$^7$ ................................................. G06K 9/62
(52) U.S. Cl. ....................................................... 382/225
(58) Field of Search ................................ 382/106, 225, 382/224, 201

(56) References Cited

U.S. PATENT DOCUMENTS 6,275,613 B1 * 8/2001 Aiger ......................... 382/195
6,446,068 B1 * 9/2002 Kortge ........................... 707/6

OTHER PUBLICATIONS

Cleary. "Analysis of an Algorithm for Finding Nearest Neighbors in Euclidean Space." ACM Trans. on Mathematical Software, vol. 5, No. 2, Jun. 1979, pp. 183–192.*

Nene et al. "A Simple Algorithm for Nearest Neighbor Search in High Dimensions." IEEE Trans. on Pattern Analysis and Machine Intelligence, vol. 19, No. 9, Sep. 1997, pp. 989–1003.*

Kamel et al., "Fast Nearest Neighbor Search for Vector Quantization of Image Data." Proc. 11$^{th}$ IAPR Int. Conf. on Pattern Recognition, vol. III, Aug. 1992, pp. 623–626.*

Bakamidis, "An Exact Fast Nearest Neighbor Identification Technique." ICASSP–93, IEEE Int. Conf. on Acoustics, Speech, and Signal Processing, vol. 5, Apr. 1993, pp. 658–661.*

Ramasubramanian et al. "Fast Nearest–Neighbor Search Based on Voronoi Projections and Its Application to Vector Quantization Encoding." IEEE Trans. on Speech and Audio Processing, vol. 7, No. 2, Mar. 1999, pp. 221–226.*

Zakarauskas et al. "Complexity Analysis for Partitioning Nearest Neighbor Searching Algorithms." IEEE Trans. on Pattern Analysis and Machine Intelligence, vol. 18, No. 6, Jun. 1996, pp. 663–668.*

* cited by examiner

*Primary Examiner*—Jon Chang

(57) ABSTRACT

A method of determining a near neighbor to a target point in multidimensional space from among a set of candidate points includes generating a matrix of bins and identifying a first bin that contains the target point. The first bin is searched for a first candidate point, and a set of proximate bins selected from the matrix are identified. Each of the proximate bins has at least a portion potentially closer to a first selected point in the first bin than is a second selected point in the first bin.

13 Claims, 2 Drawing Sheets

METHOD OF DETERMINING A NEAREST NUMERICAL NEIGHBOR POINT IN MULTI-DIMENSIONAL SPACE

FIELD OF THE INVENTION

This invention relates to numeric calculation, and particularly to methods of determining the nearest neighbor of a selected point from among a set of different points.

BACKGROUND AND SUMMARY OF THE INVENTION

Computer software applications sometimes require a determination of which of a set of points in multidimensional mathematical "space" is closest to a given target point. Each point has a number of variable parameters, each of which may vary within a range to indicate a particular quality, quantity, degree or attribute of that parameter for an element to which the target point corresponds. Each parameter is abstractly considered as a dimension, and the value of that parameter is abstractly considered as the location along an axis corresponding to that dimension. The set of points are candidate points, each representing a particular standardized instance of known characteristics, and which the application can rely on preselected heuristics for processing.

An example of the above system is a software application or module for processing or compressing image files. Such applications may make a pixel-by-pixel analysis, and use different compression algorithms or processes depending on the context of each pixel. The context of each pixel is generally defined in terms of the pixel's relation to its neighbors, and provides an indication of what processing mode is best suited to that region of the image to provide a suitable tradeoff of compression efficiency and image quality. For instance, one context model is a pixel that is identical to all adjacent pixels. For this, a compression-efficient algorithm may represent a multi-pixel block by a single color value, plus the definition of the boundaries of the block. Another context model may be a pixel that differs extremely from all adjacent pixels. This may be processed by a different algorithm that preserves the detail, and which is less compression efficient. Another context model may represent a pixel at a sharp boundary of flat regions, which is used to locate a division between large blocks of similar color data. A multitude of other context models are generated, each associated with a given compression or processing technique that is proven to be effective for that type of image characteristics.

Together, this set of context models is considered to be a set of candidate points, each with a value for each of several (or numerous) parameters. When processing an actual image, the application determines for each pixel which of the context models (or candidate points) is most similar to the pixel. This is done by generating a similar point in multi-demensional space for each pixel. Because the pixel is unlikely to be identical to one of the limited number of models, the application must determine which of the models is most similar to the pixel.

Assuming that all parameters are scaled to be of equal importance, the application simply determines which of the candidate points is mathematically spatially nearest to the target point corresponding to the pixel being analyzed. (Note that the spatial nearness of these points in a conceptual "space" is essentially unrelated to the image "space" in which the pixel and its neighbors reside; searching for the nearest point is not to be considered as searching for a nearby pixel.)

Existing systems achieve this calculation and determination of the nearest candidate point to the target point by conventional mathematical calculations in which the distance from the target point to each candidate point is determined by Pythagorean geometry. The candidate point with the smallest distance is determined to be most similar, and the processing algorithm associated with that candidate is applied for the pixel corresponding to the target point.

While effective, such systems have the disadvantage of requiring significant calculation resources, particularly as the number of dimensions and points increases. The calculations require many multiplication operations, which are relatively processor-intensive. For example, in a scenario with 10,000 candidate points and 23 parameters or dimensions, 230,000 multiplication operations would be required, plus a comparable number of additions or subtractions. This is believed to generate noticeable delay on typical computers.

The present invention overcomes the limitations of the prior art by providing a method of determining a near neighbor to a target point in multidimensional space from among a set of candidate points. The method includes generating a matrix of bins and identifying a first bin that contains the target point. The first bin is searched for a first candidate point, and a set of proximate bins selected from the matrix are identified. Each of the proximate bins has at least a portion of space potentially closer to a first selected point in the first bin than is a second selected point in the first bin. the proximate bins has at least a portion of space potentially closer to a first selected point in the first bin than is a second selected point in the first bin.

DETAILED DESCRIPTION OF A PREFERRED EMBODIMENT

Figure 1:
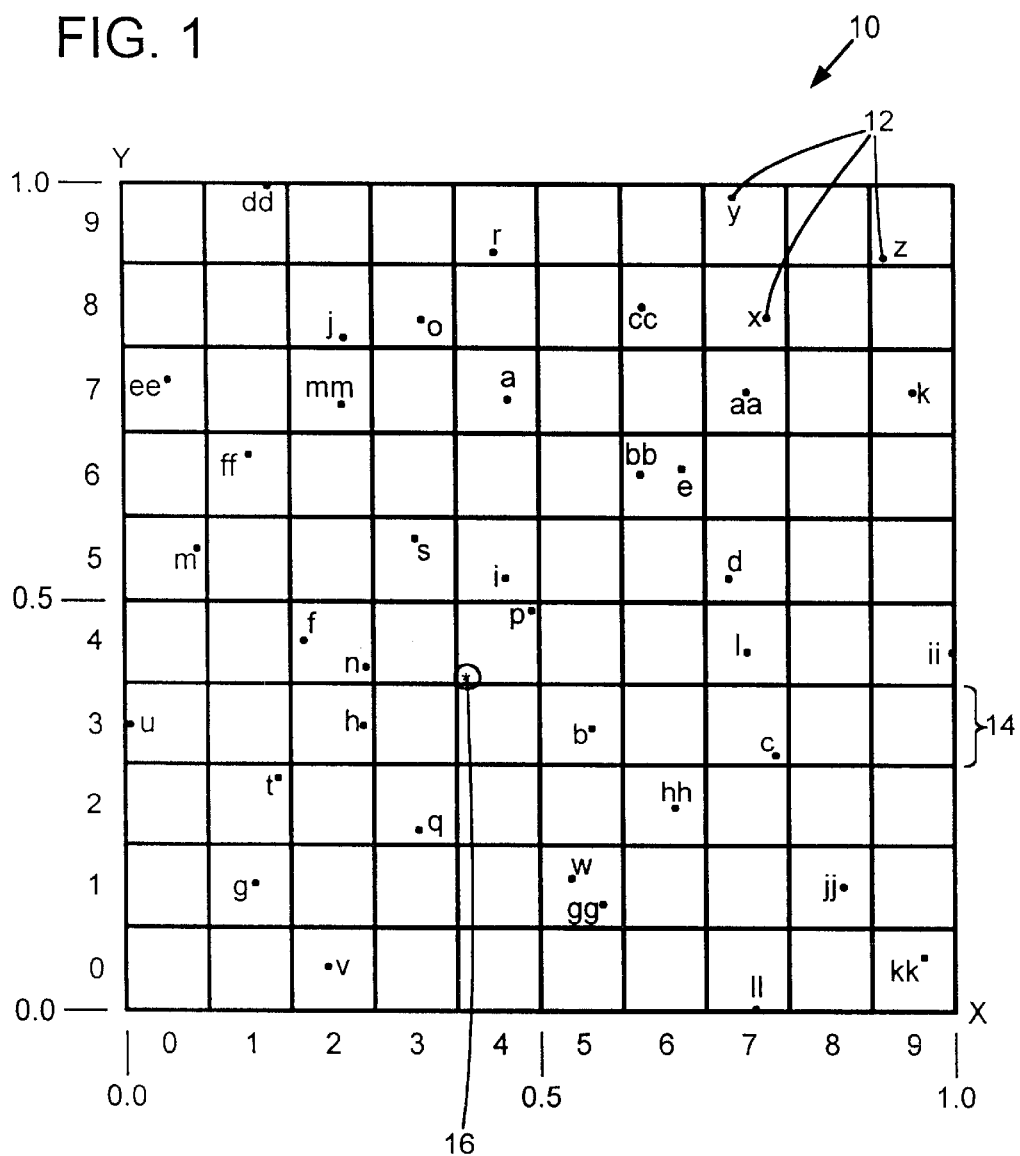
FIG. 1 is a graph of data according to a preferred embodiment of the invention.

FIG. 1 shows a simplified graph 10 that displays in two dimensions a numerical space that actually has many more dimensions, typically more than the three dimensions of physical space, with 23 dimensions contemplated in a preferred embodiment, but any number without limitation being suitable depending on the needs of possible alternative embodiments. The illustrations are symbolic of numerical data elements stored in the memory device of a computer. The computer has a processor connected to the memory device, and containing and running software modules operating according to the methods described below. An analysis module of the software operates in the processor to enact the steps described herein, including generating the illustrated bins and locating ad identifying points and performing calculations with regard to the points.

A set of "candidate" points 12 is distributed throughout the space, each point having values for each of multiple parameters that defines their location in space. The points are identified by letters a,b,c . . . aa,bb,cc . . . In the illustrated example, each point is defined in terms of its value for each of two parameters corresponding to the labeled X and Y axes. In the preferred embodiment without the simplification needed for a two-dimensional representation, each point would have a value for each of numerous parameters, each parameter corresponding to a selected dimension's axis.

The candidate points, of which 40 are shown in the illustrated example, may represent any of a wide range of elements. As discussed above, each may represent a particular context type that characterizes the nature of the relationship between an image pixel and adjacent pixels. In another application, each point may represent the image of a person's face in a database of corporate employees, so that a security system using pattern recognition can compare an imaged person of unknown identity to determine if his face matches an authorized employee in the database. Each point in that case would include Other pattern recognition systems may include a database of candidate points each corresponding to text letters or combinations of letters, fingerprints, and retina scan patterns, for example. A military weapons system my include a candidate point for each of a large number of potential aircraft, vehicles, and the like, for aid in identifying an unknown potential target as either a friend of enemy. Other examples of elements that may correspond to the set of candidate points include finding a document or image that is similar to target document or image, in a database or web search, based on a set of measurable characteristics of a document.

The invention is not limited to these image and visual examples, but can be applied where any element must be compared to a set of known elements to identify the closest match. This may include voice recognition, search engines, and innumerable alternatives. The graph is divided into "bins". Each axis is divided into a number of equally-sized segments, with ten segments in the illustrated embodiment. Accordingly, 100 square bins are defined. In the multi-dimensional embodiment with "d" dimensions, and "b" segments per axis, $b^d$ bins are provided. When three dimensions are used, each bin is a cube, when 4 or more are used, each bin is a hyper-cube. In alternative embodiments, different axes may have different scales, different numbers of segments, or unevenly spaced segments. In such cases, the bins will be rectangles, parallelepipeds, or hyper-parallelepipeds, etc.

The graph and bin limits are established in the preferred embodiment first by determining or providing the set of candidate points from a database storing the points. For each parameter (or axis), the maximum and minimum point values are determined. These maximum and minimum values are used as the limits or near limits of the range of bin values. In the preferred embodiment, the minimum may precisely determine the lower value of the lowest bin, and the maximum may determine the upper limit of the highest bin. In this case, the bin width is determined by the difference between the maximum and minimum values, divided by the number of bins. In an alternative embodiment, the bin values are set at convenient numbers to the actual parameters used, and the bin limits set so that the minimum value falls in the first bin, and the maximum value falls in the last bin.

While each axis or parameter may include values of any large or small numerical value, each may be re-scaled to a numerically convenient scale so that all axes have the same values. In the illustrated example, the values have been re-scaled to a range of 0.0–1.0 to aid computation and for clarity of illustration. The bins have been assigned numbers 0–9 on each axis, so that a bin is identified by a pair (X,Y). In an embodiment in which more than two axes are employed, the bin is identified by a set of bin number identifiers X,Y,Z,Q,R,S,T . . . ).

In a given system, such as the pattern recognition system discussed above, the bin limits are established based on the data corresponding to the candidate points. The points are then binned for each dimension, so that (in the illustrated example) all points having an x value of 0.0 or greater and less than 0.1 are binned in X-axis bin "0". All points having an x value of 0.1 or greater and less than 0.2 are binned in X-axis bin "1", and so on. Thus, a simplified database is generated without including space intensive precise values of each point in each axis, but simply providing a list of the points for each axis, with each point identified only by the bin in which it falls on that axis. This reduced size data set greatly simplifies processing and calculations.

In the illustrated embodiment, the binned points are as follows:

| X axis bin # | Points occupying bin | Y axis bin # | Points occupying bin |
|---|---|---|---|
| 0 | ee,m,u | 0 | v,ll,kk |
| 1 | dd,ff,t,g | 1 | g,w,gg,jj |
| 2 | j,mm,f,n,h,v | 2 | t,q,hh |
| 3 | o,s,q | 3 | u,h,b,c |
| 4 | r,q,i,p,* | 4 | f,n,p,l,ii,* |
| 5 | b,w,gg | 5 | m,s,i,d |
| 6 | cc,bb,e,hh | 6 | ff,bb,e |
| 7 | y,x,aa,d,l,c,ll | 7 | ee,mm,a,aa,k |
| 8 | jj | 8 | j,o,cc,x |
| 9 | z,k,ii,kk | 9 | dd,r,y,z |

This binning operation is extremely fast when done in a loop such as by the pseudo-code:
  for each dimension dim
    for each candidate point pt
      pt.bin[dim]=floor(pt.value[dim]/binwidth)

The resulting "pt.bin[dim]" is the bin number for the point "pt" in dimension "dim", based on the point's value "pt.value[dim]" for that dimension. The operation "floor (val)"represents the greatest integer less than or equal to "val". In alternative embodiments using unequal bin widths in the manner of a logarithmic or exponential scale, other calculations may be used. Where the bin widths increase by a factor of two, a shift process may be used to expedite the calculation.

With the candidate or sample points binned in advance of the multitude of operations that will use the same candidate data set, comparison analysis may proceed. Each analysis serves to identify the nearest (or an adequately near) candidate point 12 to a target point 16, symbolized by an asterisk symbol "*" in FIG. 1. For processing of an image, each pixel may provide a different target point, and the below-describes nearest-neighbor calculation is conducted for each such pixel. In a pattern recognition example, each person seeking entry to a facility is scanned to generate a new target point, which is to compared with the database of candidate points corresponding to authorized personnel.

The process continues by determining the bin of the target point; in this example the target point having values (4.01, 4.01) occupies bin (4,4). The bin occupied by the target point is then scanned to determine whether any candidate points occupy the same bin. The set of candidate points in this bin consists of the intersection of the sets of points listed in this bin for each axis. In the illustrated example, the list for bin 4 in the X axis and the list for bin 4 on the Y Axis each contain a number of points, but only one point appears in both lists. It can then be concluded that the target point's bin is occupied by point p, which has an actual value of (4.90, 4.90).

If no candidate point occupies the bin of the target point, a set of adjacent bins are searched. This may take several approaches. The adjacent "ring" or "shell" (or "hyper-shell") of bins may be included, so that the 3×3square of bins (or 3×3×3 cube of bins, etc.) centered on the target bin is searched. A preferable approach is to search adjacent bins sequentially, so that the search is stopped when a candidate point is found. This preferably begins by search the bin to which the target point is closest (assuming the target point is not perfectly centered in its bin.) In this case, bin (3,4) or bin (4,3) would be searched first (assuming the absence of point p), followed by the other, then (3,3). If the square of 4 bins does not provide a candidate point, adjacent bins (4,5) and (5,4) would be searched, followed by (5,5) if needed. Another search algorithm provides selection of a bin most adjacent to the target point, with a spiral search proceeding in a direction in a direction toward the next most adjacent bin.

If more than one candidate point occupies the target point bin (or the nearby bin in which the first candidate point is located), the distance to the nearest of the candidate points is established, and the others are ruled out for purposes of determining the nearest neighbor to the target point.

In the illustrated case in which the target point bin contains only a single candidate point, the distance between the target point and the candidate point in the bin is measured. This is done by conventional Pythagorean geometry, in which the distance is equal to the square root of the sum of the squares of the distances along each axis. In this case the square of the distance is equal to $(4.9-4.01)^2+(4.9-4.01)^2=1.58$, so that the distance is 1.26.

With a two dimensional matrix of square bins, the greatest possible distance between two points in the same bin will be (bin width* $\sqrt{2}$), or about 0.141 in the illustrated example. However, bins other than the target point's bin may include regions closer to the target point than the determined distance to the candidate point in the same bin. In the illustrated example shown in FIG. 2, a circle 20 centered on the target point 16 with a radius equal to the distance to point p is drawn. The shaded areas illustrate portions of bins other than the target bin that are closer to the target point than is point p. To ensure that the nearest point is found, these areas must be searched to determine whether they contain candidate points, and if so, which is nearest.

Because it can be determined whether a candidate point falls within the shaded area by measuring its distance from the target point, it must first be determined which candidate points to measure. Thus all points in all bins containing even a small area closer to the target point than the first candidate point are fully measured. The target point value in each axis is expanded to a range having minimum and maximum limits above and below the target point value by the established distance to the first candidate point p. In this example, an X-axis range 22 of [0.401−0.126, 0.401+0.126] or [0.275, 0.527] is established. Because of the coincidental same value of the target point in the Y axis, a similar range 24 of [0.275,0.527] is established. For each axis, it is determined which bins are overlapped by these ranges. In the illustration, bins in a rectangle defined at the lower left corner by bin (2,2) and at the upper right by bin (5,5) are included as falling within the ranges that may include closer candidate points.

Thus, in this example with a nearly worst-case large distance between the target point and first candidate point p, only 16 of 100 bins are searched, and only 8 of 40 candidate points (including the initial point p) are actually measured for a distance determination. In this case, point n, at location (0.290, 0.420) proves to be the nearest neighbor to the target point, at a distance of $\sqrt{[(0.401-0.290)^2+(0.401-0.420)^2]}=1.126$.

In fact, the calculation comparing candidate point distances with the initial candidate point distance need not take the square root, since searching for the point at the smallest squared distance will yield the point with the smallest distance. Thus, for the purposes of this disclosure and the claims that follow, all references that recite determining a distance include the determination of the square of a distance, or any other function of distance that yields an unambiguous ranking of distances. Nonetheless, an actual distance measurement of the initially located candidate point if the bin of the target point is needed to provide correct determination of bins to search for potentially closer candidates.

While this is effective, other embodiments may engage in more complex calculations to determine not the square, cube, or hypercube of bins that includes portions within the limits for each axis, but to determine exactly which bins include potentially closer areas to the target point than the first candidate point p. Such a method would exclude corner bins (2,2), (2,5), (5,2), and (5,5). This would be achieved by checking only those bins that intersect or are within the hypersphere surrounding the target point with radius equal to the distance to p.

Figure 2:
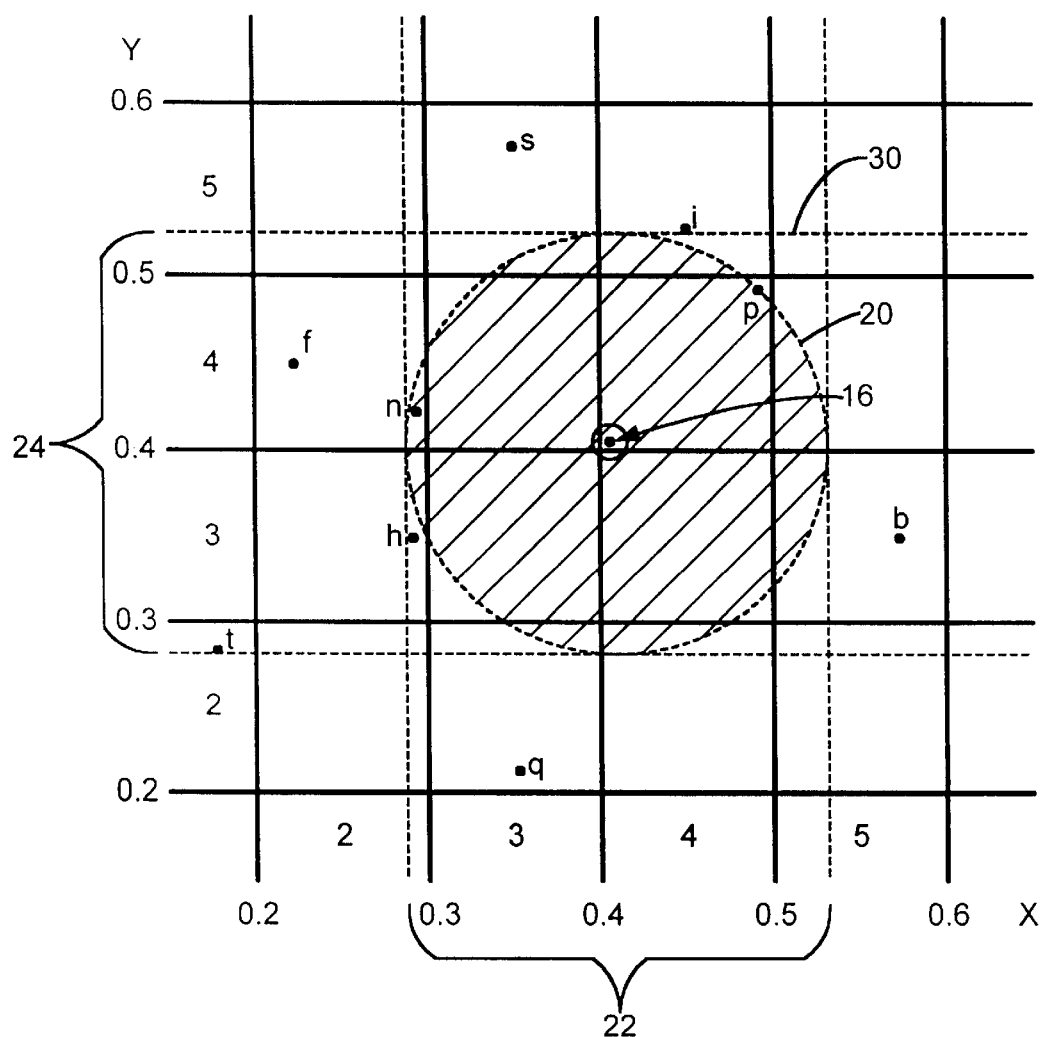
FIG. 2 is a graph of data according to the embodiment of FIG. 1.

Another variation on the preferred embodiment to reduce consumption of calculation resources would be to limit comparison and measurement to the square 30 that circumscribes the circle 20 in FIG. 2. This would require additional calculations for bins at the periphery of the square, and presumably likely to contain unimportant candidate points outside of the square. Instead of performing the measurement calculation for all points in these bins, the points are first screened to determine which have values in the appropriate axis range to fall within the square. Those (such as point "f") that fall outside the range of the square are discarded, and only those (such as point "n") that fall inside the limits of the square are subjected to the distance calculation.

Another approach is simply to determine the distance to the first candidate point or closest candidate point in the target point's bin, and to expand the square/cube/hypercube until its width just exceeds the distance. This admits more bins for calculation processes, but may be more suitable for some applications in which speed is less critical.

```
for each samplePoint
    point.ctr = 0;
The bin offset pointers are then initialized for the target point. In this case
the target point is at {3,3} providing:
targetPoint.offsetLo[0] = targetPoint.offsetHi [0] = 3;
targetPoint.offsetLo[1] = targetPoint.offsetHi[1] = 3;
.
.
.
targetPoint.offsetLo[nDims−1] = targetPoint.offsetHi[nDims−1] = n
This completes the setup. A loop proceeds as follows:
while( 1) {
    for each dimension dim
        for each samplePoint, sp
        {
            if(sp.bin[ dim] == targetPoint.offsetLo[dim])
                ++sp.ctr.
            else if( sp.bin[ dim ] == targetPoint.offsetHi[dim])
                ++sp.ctr.
            if (sp.ctr == nDimensions)
            {
                *This point is a candidate*
                break;
            }
            −−targetPoint.offsetLo[ dim] ;
```

-continued

```
            ++targetPoint.offsetHi[dim];
        }
}
```

While the above is discussed in terms of preferred and alternative embodiments, the invention is not intended to be so limited. For instance, the absolute nearest neighboring point need not be found. In some systems where an adequately near point is found within a distance less than a preselected tolerable threshold, there may be insignificant benefit to finding a still-nearer point.

What is claimed is:

1. A method of determining a near neighbor to a target point in multidimensional space from among a set of candidate points, comprising:

generating a matrix of bins;

identifying a first bin that contains the target point;

locating a first candidate point in the first bin;

searching at least a second bin adjacent to the first bin for a second candidate point;

calculating the distances between each of the first and second candidate points and the target point; and calculating the distance between the first candidate point and the target point prior to searching the second bin, and including determining which bin to search based on the distance between the first candidate point and the target point.

2. The method of claim 1 wherein the matrix of bins encompasses the target point and the candidate points.

3. The method of claim 1 wherein generating the matrix of bins includes, for each dimension, establishing a maximum and minimum bin limits to closely encompass the points.

4. The method of claim 1, wherein searching at least a second bin adjacent to the first bin for a second candidate point includes searching all bins that include portions closer to the target point than the first candidate point.

5. The method of claim 1 wherein searching at least a second bin adjacent to the first bin for a second candidate point includes searching all bins that include portions potentially closer to a first selected point in the first bin than a second selected point in the first bin.

6. The method of claim 1 wherein searching at least a second bin adjacent to the first bin for a second candidate point includes searching all bins that include portions.

7. A method of determining a near neighbor to a target point in multidimensional space from among a set of candidate points, comprising:

generating a matrix of bins;

identifying a first bin that contains the target point;

searching the first bin for a first candidate point;

identifying a set of proximate bins selected from the matrix, each of the proximate bins having at least a portion potentially closer to a first selected point in the first bin than is a second selected point in the first bin; and wherein identifying the set of proximate bins includes selecting all bins having a portion separated from any portion of the first bin by a distance less than the distance between two maximally separated points in opposed corners of the first bin.

8. The method of claim 7 including searching the first bin for all candidate points and determining which of the candidate points in the first bin is closest to the target point.

9. The method of claim 7 wherein the matrix of bins encompasses the target point and the candidate points.

10. The method of claim 7 wherein generating the matrix of bins includes, for each dimension, establishing a maximum and minimum bin limits to closely encompass the points.

11. The method of claim 7 including identifying the location of the target point within the bin, and determining which proximate bins to search based on the location.

12. The method of claim 7 including searching each of the selected bins for candidate points, and calculating a distance from each located candidate point and the first candidate point to the target point, such that the nearest candidate point is determined.

13. The method of claim 7 including calculating the distance between the first candidate point and the target point prior to searching any of the proximate bins, and wherein identifying a set of proximate bins is based on the distance between the first candidate point and the target point.

* * * * *

UNITED STATES PATENT AND TRADEMARK OFFICE
CERTIFICATE OF CORRECTION

PATENT NO. : 6,661,922 B1
DATED : December 9, 2003
INVENTOR(S) : Boettcher et al.

It is certified that error appears in the above-identified patent and that said Letters Patent is hereby corrected as shown below:

Title page,
Item [*] Notice, delete "975 days" replace with -- 536 days --.

Signed and Sealed this

Fifteenth Day of November, 2005

JON W. DUDAS
*Director of the United States Patent and Trademark Office*